United States Patent
Koo et al.

(10) Patent No.: US 8,331,933 B2
(45) Date of Patent: Dec. 11, 2012

(54) METHOD FOR PROVIDING MULTI-LEVEL ACCESS SERVICES IN COMMON ACCESS CHANNEL

(75) Inventors: Chang-Hoi Koo, Seongnam-si (KR); Jingyi Liao, Beijing (CN); Hai Wang, Beijing (CN); Dong-Seek Park, Yongin-si (KR); Ho-Kyu Choi, Seoul (KR)

(73) Assignees: Samsung Electronics Co., Ltd (KR); Beijing Samsung Telecom R&D Center (CN)

( * ) Notice: Subject to any disclaimer, the term of this patent is extended or adjusted under 35 U.S.C. 154(b) by 1787 days.

(21) Appl. No.: 10/554,261

(22) PCT Filed: May 10, 2004

(86) PCT No.: PCT/KR2004/001077
§ 371 (c)(1),
(2), (4) Date: Oct. 18, 2006

(87) PCT Pub. No.: WO2004/100403
PCT Pub. Date: Nov. 18, 2004

(65) Prior Publication Data
US 2007/0032255 A1 Feb. 8, 2007

(30) Foreign Application Priority Data
May 9, 2003 (CN) .................................. 03123613.8

(51) Int. Cl.
*H04W 36/00* (2009.01)
(52) U.S. Cl. ........ 455/436; 370/350; 370/448; 455/509; 455/512; 455/515; 455/516

(58) Field of Classification Search .................. 455/512, 455/436
See application file for complete search history.

(56) References Cited

U.S. PATENT DOCUMENTS
6,215,792 B1 * 4/2001 Abi-Nassif ................... 370/458
(Continued)

FOREIGN PATENT DOCUMENTS
EP 1 296 484 3/2003

OTHER PUBLICATIONS

Changhoi Koo et al., "Individual Backoff Time Allocation for Each Ranging Code Set", May 15, 2005.

(Continued)

*Primary Examiner* — Charles Appiah
*Assistant Examiner* — Mazda Sabouri
(74) *Attorney, Agent, or Firm* — The Farrell Law Firm, P.C.

(57) ABSTRACT

The present invention relates to a method for performing a ranging operation according to the priority order in a mobile communication system using a BWA (Broadcast Wireless Access) scheme. The method according to the invention for performing a range operation by a subscriber terminal in a mobile communication system using the BWA (Broadcast Wireless Access) scheme comprises steps of: receiving backoff domains having the start and end values of the backoff corresponding to each ranging operation, the backoff domains being determined from a base station according to the priority order of the ranging operations between the base station and subscriber terminals; performing a ranging operation and, if it is determined that the step of performing the ranging operation fails, selecting backoff domains among the received backoff domains according to the priority order of the performed ranging operations; and, re-performing the ranging operation according to the selected backoff domains.

22 Claims, 12 Drawing Sheets

U.S. PATENT DOCUMENTS

| | | | |
|---|---|---|---|
| 6,400,695 B1* | 6/2002 | Chuah et al. | 370/310 |
| 2002/0049057 A1* | 4/2002 | Moulsley et al. | 455/436 |
| 2003/0108126 A1* | 6/2003 | Akopian | 375/326 |
| 2003/0125046 A1* | 7/2003 | Riley et al. | 455/456 |
| 2003/0198179 A1* | 10/2003 | Koo et al. | 370/208 |
| 2004/0174845 A1* | 9/2004 | Koo et al. | 370/328 |
| 2004/0176094 A1* | 9/2004 | Kim et al. | 455/438 |
| 2004/0185852 A1* | 9/2004 | Son et al. | 455/438 |
| 2004/0185853 A1* | 9/2004 | Kim et al. | 455/438 |
| 2005/0266848 A1* | 12/2005 | Kim | 455/436 |
| 2007/0047570 A1* | 3/2007 | Benveniste | 370/448 |

OTHER PUBLICATIONS

Dr-Jiunn Deng et al., "A Priority Scheme for IEEE 802.11 DCF Access Method", IEICE Trans. Commun., vol. E82-B, No. 1, Jan. 1999.

Ki Ho Chung et al., "Concept of Ranging Code Set in BWA", Jan. 22, 2001.

Yang Xiao, "Backoff-based Priority Schemes for IEEE 802.11", May 11, 2003.

* cited by examiner

METHOD FOR PROVIDING MULTI-LEVEL ACCESS SERVICES IN COMMON ACCESS CHANNEL

1. FIELD OF THE INVENTION

The present invention relates generally to a mobile communication system employing a Broadband Wireless Access (BWA) scheme, and in particular, to an apparatus and method for performing a ranging operation in a BWA mobile communication system.

2. DESCRIPTION OF THE RELATED ART

In a $4^{th}$ generation (4G) communication system which is a next generation communication system, active researches are being conducted on technology for providing users with services guaranteeing various qualities of service (QoSs) at a data rate of about 100 Mbps. The current $3^{rd}$ generation (3G) communication system generally supports a data rate of about 384 Kbps in an outdoor channel environment having a relatively poor channel environment, and supports a data rate of a maximum of 2 Mbps even in an indoor channel environment having a relatively good channel environment.

Meanwhile, a wireless local area network (LAN) system and a wireless metropolitan area network (MAN) system generally support a data rate of 20 Mbps to 50 Mbps. Therefore, in the current 4G communication system, active researches are being carried out on a new communication system securing mobility and QoS for the wireless LAN system and the wireless MAN system supporting a relatively high data rate in order to support high-speed services that the 4G communication system aims to provide.

Due to its broad service coverage and high data rate, the wireless MAN system is suitable for high-speed communication services. However, because mobility of a user, or a subscriber station (SS), is not taken into consideration, handover caused by fast movement of the subscriber station is also not considered in the system. Therefore, an apparatus and scenario for supporting handover caused by fast movement of the subscriber station is being studied actively.

FIG. 1 is a diagram illustrating a configuration of an IEEE 802.16e communication system.

Referring to FIG. 1, the IEEE 802.16e communication system has a multicell configuration, i.e., has a cell 100 and a cell 150, and is comprised of a base station (BS) 110 controlling the cell 100, a base station 140 controlling the cell 150, and a plurality of subscriber stations 111, 113, 130, 151 and 153. Transmission/reception between the base stations 110 and 140 and the subscriber stations 111, 113, 130, 151 and 153 is achieved using an OFDM/OFDMA scheme. Among the subscriber stations 111, 113, 130, 151 and 153, the subscriber station 130 is located in a boundary area, or a handover area, of the cell 100 and the cell 150. Therefore, it is necessary to support handover for the subscriber station 130 in order to support mobility of the subscriber station 130.

The wireless MAN system is a Broadband Wireless Access (BWA) communication system, and a system employing an Orthogonal Frequency Division Multiplexing (OFDM) scheme and an Orthogonal Frequency Division Multiplexing Access (OFDMA) scheme to support a broadband transmission network for a physical channel of the wireless LAN system is called an IEEE 802.16a communication system. The IEEE 802.16a communication system is a broadband wireless access communication system employing OFDM/OFDMA scheme. Because the IEEE 802.16a communication system applies the OFDM/OFDMA scheme to the wireless MAN system, it can support high-speed data transmission by transmitting a physical channel signal using a plurality of sub-carriers.

Meanwhile, the IEEE 802.16e communication system is a system designed to consider mobility of subscriber stations in the IEEE 802.16a communication system. In conclusion, both the IEEE 802.16a communication system and the IEEE 802.16e communication system are a broadband wireless access communication system using the OFDM/OFDMA scheme.

A description will now be made of rangings, including Initial Ranging, Maintenance Ranging (or Periodic Ranging), and Bandwidth Request Ranging, all of which are used in the IEEE 802.16a communication system.

First, the initial ranging will be described.

The initial ranging is performed to acquire synchronization with a subscriber station by a base station. The initial ranging is performed to adjust a correct offset between the subscriber station and the base station and to control transmission power. That is, the subscriber station receives a DL_MAP message and a UL_MAP message upon power on to acquire synchronization with the base station, and then performs the initial ranging in order to adjust the time offset with the base station and transmission power. Because the IEEE 802.16a communicant system uses the OFDM/OFDMA scheme, sub-channels and ranging codes are required for the ranging procedure, and a base station assigns available ranging codes according to an object, or a type, of the rangings. This will be described in detail herein below.

The ranging code is generated by segmenting a pseudo-random noise (PN) sequence having a length of, for example, $2^{15}-1$ bits into predetermined units. Generally, two ranging sub-channels having a length of 53 bits constitute one ranging channel, and a PN code is segmented through a ranging channel having a length of 106 bits to generate ranging codes. Of the formed ranging codes, a maximum of 48 ranging codes RC#1 to RC#48 can be assigned to subscriber stations, and as a default value, a minimum of 2 ranging codes per subscriber station are applied to the rangings of the 3 objects, i.e., initial ranging, periodic ranging and bandwidth request ranging. In this way, different ranging codes are assigned to the rangings of the 3 objects. For example, N ranging codes are assigned for the initial ranging (N RCs (Ranging Codes) for initial ranging), M ranging codes are assigned for the periodic ranging (M RCs for maintenance ranging), and L ranging codes are assigned for bandwidth request ranging (L RCs for BW-request ranging). The assigned ranging codes, as described above, are transmitted to subscriber stations through a DL_MAP message, and the subscriber stations perform a ranging procedure by using ranging codes included in the DL_MAP message according to their objects.

Second, the periodic ranging will be described.

The periodic ranging represents ranging periodically performed to adjust a channel status with a base station by a subscriber station that adjusted a time offset with the base station and transmission power through the initial ranging. The subscriber station performs the periodic ranging using ranging codes assigned for the periodic ranging.

Third, the bandwidth request ranging will be described.

The bandwidth request ranging is ranging used to request bandwidth assignment to actually perform communication with a base station by a subscriber station that adjusted a time offset with the base station and transmission power through the initial ranging.

Meanwhile, the DL_MAP message is periodically broadcasted from a base station to all subscriber stations. When a subscriber station continuously receives the DL_MAP message, it is said that the subscriber station is synchronized with the base station. That is, subscriber stations receiving the DL_MAP message can receive all messages transmitted over a forward link.

When a subscriber station fails to access the base station, the base station transmits a UCD message including information indicating an available backoff value to the subscriber station.

When the ranging is performed, the subscriber station transmits a RNG_REQ message to the base station, and the base station receiving the RNG_REQ message transmits to the subscriber station an RNG_RSP message including information for correcting the above-mentioned frequency, time and transmission power.

As described above, the IEEE 802.16a communication system considers only a state in which a current subscriber station is fixed, i.e., mobility of the subscriber station is not considered, and a single-cell configuration. However, as described above, the IEEE 802.16e communication system is specified as a system that considers mobility of a subscriber station in the IEEE 802.16a communication system. Therefore, the IEEE 802.16e communication system must consider mobility of a subscriber station in a multicell environment. In order to provide mobility of a subscriber station in a multicell environment, modification of operations of the subscriber station and the base station is necessarily needed. In particular, in order to support mobility of the subscriber station, active research is being conducted on handover of the subscriber station considering the multicell environment.

In a broadband wireless mobile communication system, a subscriber station receives preambles transmitted from a plurality of base stations. The subscriber station measures CINRs of the received preambles. The subscriber station selects a base station having the highest CINR among the measured CINRs. That is, the subscriber station selects a base station having the best reception condition among a plurality of base stations transmitting preamble channels, thereby detecting its base station. Herein, a base station having the best reception condition, selected by the subscriber station, is called a "serving base station."

The serving base station transmits a neighbor base station advertisement (MOB_NBR_ADV) message to the subscriber station.

The MOB_NBR_ADV message includes a plurality of IEs, such as Management Message Type representing a type of a transmission message, Configuration Change Count representing the number of changes in configuration, N_NEIGHBORS representing the number of neighbor base stations, Neighbor BS-ID representing an identifiers (ID) of each of the neighbor base stations, Physical Frequency representing a physical channel frequency of the neighbor base station, and TLV Encoded Neighbor Information representing other information related to the neighbor base station. In addition, the MOB_NBR_ADV message includes Hysteresis threshold representing a reference CINR based on which a subscriber station can request handover, and MAHO report period information for periodic scanning report.

A subscriber station receiving the MOB_NBR_ADV message transmits a Scanning Interval Allocation Request (MOB_SCN_REQ) message to the serving base station when the subscriber station desires to scan CINRs of preamble signals transmitted from neighbor base stations. A time at which the subscriber station requests scanning is not directly related to an operation of scanning CINR of the preamble signal, so a detailed description thereof will be omitted.

The MOB_SCN_REQ message includes a plurality of IEs, such as Management Message Type representing a type of a transmission message, and Scan Duration representing scanning duration for which the subscriber station desires to scan CINRs of preamble signals transmitted from the neighbor base stations. The Scan Duration is formed on a frame basis. The Management Message Type in which the MOB_SCN_REQ message is to be transmitted has not been defined yet (Management Message Type=undefined).

A serving base station receiving the MOB_SCN_REQ message transmits to the subscriber station a MOB_SCN_RSP message including information to be scanned by the subscriber station.

The MOB_SCN_RSP message includes a plurality of IEs, such as Management Message Type representing a type of a transmission message, connection ID (CID) of a subscriber station that transmitted the MOB_SCN_REQ message, and Scan Duration. The Management Message Type in which the MOB_SCN_RSP message is to be transmitted has not been defined yet (Management Message Type=undefined), and the Scan Duration represents duration for which the subscriber station performs pilot CINR scanning.

Upon receiving the MOB_SCN_RSP message including scanning information, a subscriber station scans CINRs for neighbor base stations detected through the MOB_NBR_ADV message according to the scanning information parameters.

In the IEEE 802.16e communication system, in order to support handover, a subscriber station must measure CINRs of preamble signals transmitted from its neighbor base stations and its current base station, i.e., a serving base station, and if CINR of a preamble signal transmitted from the serving base station is lower than CINRs of preamble signals transmitted from the neighbor base stations, the subscriber station sends a handover request to the active base station.

As described above, in a wireless communication system, information is exchanged between a plurality of subscriber stations and base stations. A communication system allowing a plurality of the subscriber stations to randomly access a base station supports at least one reverse common access channel.

That is, when the subscriber station intends to access the base station, the subscriber station initializes an access request in a selected reverse common access channel. In this case, the base station acquires access request information from the subscriber station by detection in the reverse common access channel.

Due to an access environment provided by a reverse common access channel for media sharing, a subscriber station needs to adopt an appropriate random access method for avoiding or reducing collision between access requests from different subscriber stations.

The random access method is divided into an Additive Links Online Hawaii Area (ALOHA) method for detecting a channel before transmitting packet, and a slot ALOHA method for not performing channel detection before packet transmission.

Generally, the slot ALOHA technology for not detecting access requests from other subscriber stations before packet transmission cannot avoid collision between access requests from different subscriber stations. In such ALOHA technology, if it is determined that an access request from a subscriber station is collided, the access request from the subscriber station is reinitialized. In the re-initialization process, an access request occurring at a time after a backoff calculated and determined by a backoff algorithm is reinitialized.

The ALOHA technology is simple in its design because less inter-system control message requests occur in the system, but collision occurs between access requests from subscriber stations. For this reason, the ALOHA technology is applied to a system in an optical traffic environment where collision between access requests scarcely occurs.

Carrier Sense Multiple Access (CSMA) technology, a different random access method, requires channel detection before packet transmission. The CSMA protocol technology is different from the ALOHA technology in that it needs channel detection before packet transmission. Though the channel detection, the CSMA technology can further reduce collision compared with the ALOHA technology, thereby providing better traffic. However, as the CSMA protocol technology first performs channel detection, message requests increase according thereto, and the increase in message request increases complexity of system design and requires a control technology such as the channel detection, causing an increase in cost.

The ALOHA protocol, a random protocol well known in the communication network field, was originally studied by several researchers in University of Hawaii to connect multiple wireless packet terminals to each other. The ALOHA and slot ALOHA structure-based technology is suitable for an optical traffic environment, and is simple in design because it needs less system information.

The ALOHA technology has been popularly used in a wireless communication system. For example, the ALOHA technology has been applied to the IEEE 802.16a communication system which is a broadband wireless access communication system using a frequency between 2 and 11 GHz.

The IEEE 802.16a technology chiefly aims at providing fixed broadband access technology. The IEEE 802.16a technology provides three operation modes: single carrier, OFDM, and OFDMA modes.

The single carrier and OFDM operation modes initialize access request in a reverse access channel by a message request from a media access control (MAC) layer of a subscriber station. However, the OFDMA operation mode needs pseudo-random code information for performing access request by the subscriber station.

According to the IEEE 802.16a technology, when a subscriber station needs to access a network, the subscriber station performs a network entering procedure that should be performed under mutual cooperation between the subscriber station and the base station in the IEEE 802.16a technology. A brief description of the network entering procedure included in the IEEE 802.16a technology will now be made below.

The subscriber station includes channel assignment information for a reverse channel and a forward channel detected in a forward control channel transmitted from a base station, and performs synchronization with the base station. The subscriber station operates in cooperation with a network that performs an initial ranging procedure. The subscriber station negotiates with a network including such information as system service capacity of the subscriber station, authentication, and a registration step. Further, the subscriber station installs session connection and other operations. The network entering procedure is provided for a subscriber station using a random access method similar to the ALOHA protocol during the initial ranging measurement procedure. Thereafter, when the subscriber station fails to perform correct access request from the base station due to collision, the subscriber station performs a backoff procedure.

The backoff procedure will be described in detail herein below.

When backoff occurs due to interruption of access request, a backoff time is calculated by a backoff algorithm previously designated on a backoff domain. For the backoff time calculated in this manner, the subscriber station suffers delay. When the backoff time expires, the subscriber station reinitializes information for entering a network through another access request.

Assignment information of the backoff domain is periodically provided by a system for subscriber stations within a common control channel. Commonly, various backoff time assignments and backoff algorithms are provided to enable all users to fairly access a system.

Meanwhile, in a multicell mobile communication system, inevitable mobility of a subscriber station brings about a call discontinuity problem during handover. This provides how to maintain a session when a subscriber station is located in an area where multiple cells overlap each other. Such a problem can be resolved by a hard handover method.

The hard handover procedure will now be described herein below.

A subscriber station first disconnects connection pre-connected to a base station for the hard handover time. Thereafter, the subscriber station accesses again the network system and establishes connection with a newly selected base station within a time period for which it is considered that the subscriber station can receive a service from the system. IEEE 802.16e was extended from IEEE 802.16a in order to support mobility of subscriber stations, and the IEEE 802.16e is so designed as to include IEEE 802.16a technology in order to provide fixed connection to the subscriber stations.

In the IEEE 802.16e, the hard handover method is performed through a method for initializing an access request for selecting a new base station by a subscriber station. In addition, a network entering procedure for maintaining compatibility with IEEE 802.16a is equal to a network entering procedure of IEEE 802.16a. In such a network entering procedure, a subscriber station first acquires channel assignment information for a reverse channel and a forward channel, detected from a forward control channel. Next, the subscriber station enters a corresponding network as it acquires synchronization with a base station.

The subscriber station operates in cooperation with a connection procedure of a newly selected base station. Here, the connection procedure includes performing partial authentication and subscriber station registration, and re-establishing session connection.

A description will now be made of a difference between handover in an initial ranging procedure of a subscriber station and handover requested by a network access procedure.

First, the handover in the network access procedure aims at continuously maintaining a session requesting an access service of a subscriber station, generally determined within a short time period. However, the handover in the initial ranging procedure of a subscriber station aims at making a network the subscriber station first accesses. Accordingly, in some cases, a maximum access delay of the subscriber station is shorter than a handover time for initial ranging of the subscriber station. Therefore, the initial ranging procedure of a subscriber station needs to make a handover time for network access to go in advance of that in the general initial ranging procedure of a subscriber station. However, in terms of a service provided to allow subscriber stations to fairly access a system, aimed by the IEEE 802.16a technology, an access request for averagely performing an access procedure for allowing all subscriber stations to enter the network must be made. In this case, for example, an actual IEEE 802.16a access service method is used in a common access channel disadvantageously. More specifically, a request for faster handover necessary for network access increases an access time for handover, causing the huge amount of collisions between handover access requests and other access requests. As a result, such a request cannot satisfy a fast access request for handover.

Further, in case of IEEE 802.16a having various access service requests for rapidly entering a network requested by the handover, a possible structure for a network entering procedure adopted by IEEE 802.16a provides an access channel assigned for an access request for handover by the system. However, this method assigns network resource such as bandwidth, causing an unnecessary waste of resource.

In conclusion, a difference between the network entering procedure requested by handover and the initial ranging procedure requested by handover is as follows.

First, the network entering procedure requested by handover establishes connection between a subscriber station and a base station before handover occurs. Next, the subscriber station previously includes system information such as appropriate service capability of the system and a system time.

In order to improve handover efficiency, the network entering procedure requested by handover can disregard or skip several steps predefined in IEEE 802.16a.

Moreover, in order to simplify a particular network entering step for handover and provide a fast access service requested by handover, it is necessary to provide a method for defining access request information by the system during handover.

SUMMARY OF THE INVENTION

It is, therefore, an object of the present invention to provide a method for defining a network access request during a handover time and supporting multilevel access service in a system using a common access channel for performing an access request service.

It is another object of the present invention to provide a method that can be conveniently used by IEEE 802.16e describing a handover request for fast network access using a common access channel.

It is further another object of the present invention to provide a method for supporting a system providing, on an on-demand basis or periodically, assignment information for each access channel corresponding to a multiple backoff domain and common access channel information of a subscriber station, and supporting multilevel access services using a common access channel, in order to avoid collision between an operation of calculating an access request capable of selecting a backoff domain by a subscriber station according to access type and an operation of determining a time for reinitializing an access request from a corresponding backoff domain, in a system based on ALOHA or slot ALOHA technology.

It is yet another object of the present invention to provide an access service having at least two levels using the above method.

The above and other objects are achieved by providing a method for performing a ranging operation by a subscriber station in a mobile communication system using a broadband wireless access scheme, the method comprising the steps of receiving, from a base station, backoff domains having a backoff start point and a backoff end point for each of rangings, determined according to priority levels of the rangings between the base station and subscriber stations; performing a ranging operation with the base station, and selecting a backoff domain corresponding to a priority level of the performed ranging among the received backoff domains if the ranging fails; and re-performing a ranging operation with the base station according to the selected backoff domain.

The priority level is determined according to a service quality level of data provided to the subscriber stations and whether handover of the subscriber stations is performed.

The step of re-performing a ranging operation with the base station according to the selected backoff domain comprises the step of re-performing a ranging operation with the base station at a particular time between the back start point and the backoff end point for the selected backoff domain.

The backoff domains are determined so that a time period occupied by a backoff domain having a highest priority level becomes a shortest time period and a time period occupied by a backoff domain having a high priority level is shorter than a time period occupied by a backoff domain having a low priority level.

The above and other objects are achieved by providing a method for performing handover for an access service on a common access channel in a mobile communication system using a broadband wireless access scheme, the method comprising the steps of: receiving backoff domains having a backoff start point and a backoff end point for each of subscriber stations, when handover between a base station and the subscriber stations is performed; checking the received backoff domains, and selecting a backoff domain for handover among the backoff domains; and determining a backoff value corresponding to the selected backoff domain, and re-requesting ranging after waiting for the determined backoff value.

The above and other objects are achieved by providing a method for transmitting backoff values used for rangings between a base station and subscriber stations in a mobile communication system using a broadband wireless access scheme, the method comprising the steps of: determining backoff domains having a backoff start point and a backoff end point according to a priority level of each of the rangings, for each of the rangings; and transmitting the backoff domains determined for each of the rangings to the subscriber stations.

The step of determining backoff domains according to a priority level of each of the rangings comprises the step of determining the backoff domains so that a time period occupied by a backoff domain having a highest priority level becomes a shortest time period and a time period occupied by a backoff domain having a high priority level is shorter than a time period occupied by a backoff domain having a low priority level.

The above and other objects are achieved by providing a method for performing a ranging operation in a mobile communication system using a broadband wireless access scheme, the method comprising the steps of: periodically receiving by a subscriber station a broadcasting message and uplink channel information (UL-MAP) from a base station by detecting on a common control channel; randomly selecting an access channel to be accessed through the uplink channel information, and then transmitting a ranging request message for an access in the selected access channel; comparing the number of retransmissions of the request message with a predefined value, if reception of a response message from the base station exceeds a response waiting time; comparing the number of retransmissions with an allowable access processing time if the number of retransmissions is smaller than the predefined value; selecting a backoff domain according to a priority level of a service level if the number of retransmissions does not exceed the allowable access processing time; and selecting a backoff value and calculating a backoff time from the selected backoff domain, and re-transmitting a ranging request message in the access channel if the calculated backoff time has passed.

The above and other objects are achieved by providing a handover apparatus for providing an access service on a common access channel in a mobile communication system, the apparatus comprising a subscriber station that requests ranging as it enters a network for handover; and a base station that transmits handover information to the subscriber station; wherein when the subscriber station requests ranging as it enters the network for handover, the subscriber station receives backoff start information and backoff end information from the base station and determines a backoff value for handover according to the received backoff start information and backoff end information.

The subscriber station re-requests ranging to the base station after waiting for the determined backoff value when the ranging fails.

The above and other objects are achieved by providing an apparatus for performing a ranging operation in a mobile communication system using a broadband wireless access scheme, the apparatus comprising a subscriber station for receiving and selecting, from a base station, backoff domains having a backoff start point and a backoff end point for each of rangings determined according to a priority level. If the subscriber station fails to perform ranging, the subscriber station selects a backoff domain corresponding to a priority level of the ranging among the received backoff domains and re-performs a ranging operation with the base station according to the selected backoff domain.

The above and other objects are achieved by providing an apparatus for performing an apparatus for transmitting backoff values used for rangings of subscriber stations in a mobile communication system using a broadband wireless access scheme, the apparatus comprising a base station for determining backoff domains having a backoff start point and a backoff end point according to a priority level of each of rangings, for each of the rangings, and transmitting the backoff domains determined for each of the rangings to the subscriber stations.

DETAILED DESCRIPTION OF THE PREFERRED EMBODIMENT

A preferred embodiment of the present invention will now be described in detail with reference to the annexed drawings. In the following description, a detailed description of known functions and configurations incorporated herein has been omitted for conciseness.

Before a detailed description of the present invention is given, it should be noted that a base station performs broadcasting though a UCD message so that it can adjust a backoff value which is a waiting time until the next re-request, when subscriber stations fail to request ranging. For example, when a subscriber station fails to request ranging during handover, the subscriber station is allowed to select a backoff time of a previous time having a higher priority level, thereby enabling fast handover.

The present invention provides a method for defining a network access request for handover and providing a multi-level access service in a system using a common access service for performing an access service. This can be conveniently used by IEEE 802.16e technology that supplements a request for a fast network access service required by handover using a common access channel.

Figure 1:
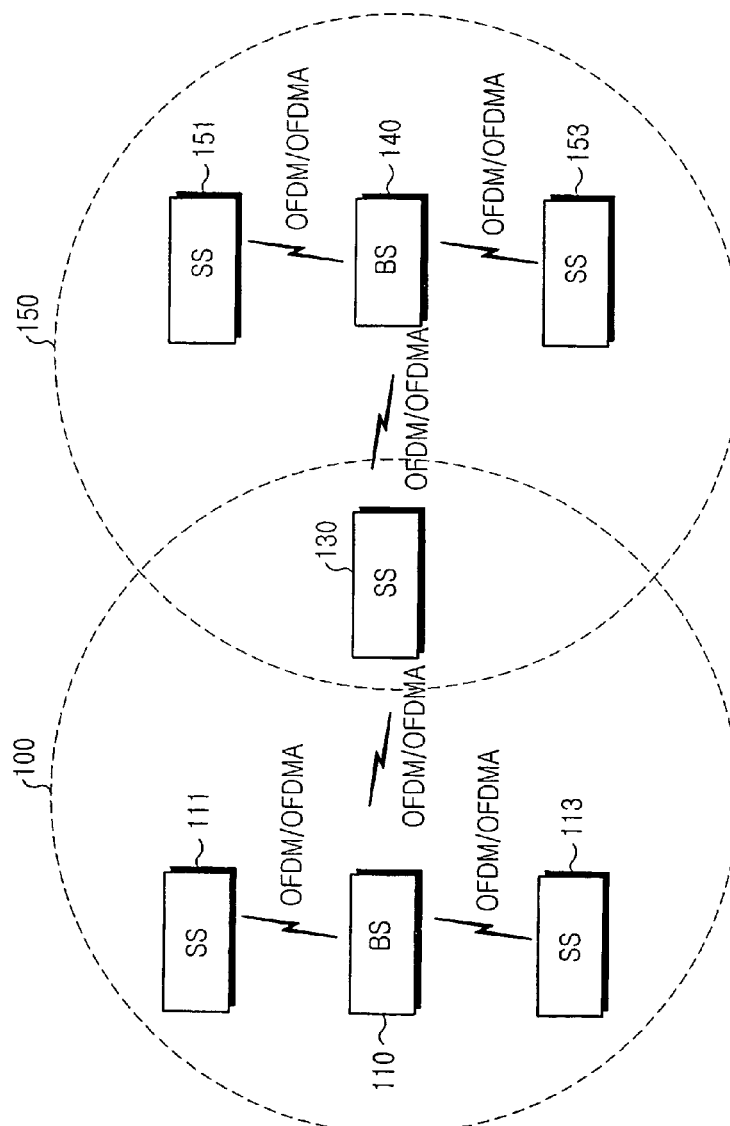
FIG. 1 is a diagram illustrating a configuration of a general IEEE 802.16e communication system.
Figure 2:
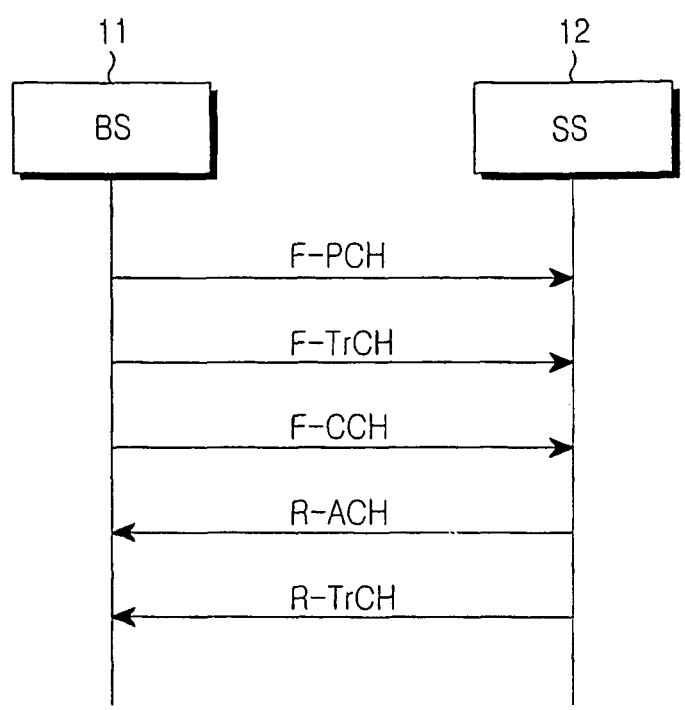
FIG. 2 is a diagram illustrating a method for assigning forward and reverse channels according to an embodiment of the present invention.

With reference to FIG. 2, a description will now be made of a method for assigning forward and reverse channels according to an embodiment of the present invention.

FIG. 2 is a diagram illustrating a method for assigning forward and reverse channels according to an embodiment of the present invention.

In a wireless communication system such as a broadband wireless access system defined by IEEE 802.16e technology, mutual information between a subscriber station and a base station is transmitted over a multiple logical channel. According to a transmission direction of data information, the logical channel can be divided into a forward channel transmitted from a base station to a subscriber station, and a reverse channel transmitted from a subscriber station to a base station.

Referring to FIG. 2, a forward channel between a subscriber station (SS) 12 and a base station (BS) 11 includes a forward pilot channel (F-PCH), a forward common control channel (F-CCH), and a forward traffic channel (F-TrCH).

The forward pilot channel is used for synchronization between the subscriber station 12 and the base station 11. The forward common control channel is used for transmitting common control information and a network parameter transmitted from the base station 11 to the subscriber station 12. The common control information includes channel assignment information for reverse and forward channels. Finally, the forward traffic channel is used for transmitting forward traffic information transmitted from the base station 11 to the subscriber station 12.

Next, a reverse channel between the base station 11 and the subscriber station 12 includes a reverse access channel (R_ACH) and a reverse traffic channel (R-TrCH).

The reverse access channel is used for an access service of the subscriber station 12, and the reverse traffic channel is used for transmitting reverse traffic information transmitted from the subscriber station 12 to the base station 11.

When a subscriber station intends to access a system in a wireless environment, the subscriber station should trace information from a forward pilot channel and complete a synchronization process with a base station on a downlink, which can be performed by capturing. The subscriber station also needs a process of acquiring common control information and a network parameter transmitted over a forward common control channel. The common control information includes channel assignment information for reverse and forward channels as well as parameter information related to each channel, and the subscriber station can initialize an access request in a selected access channel based on the information.

With reference to FIG. 3, a description will now be made of frame formats of a downlink transmission signal and an uplink transmission signal in a time domain.

Figure 3A:
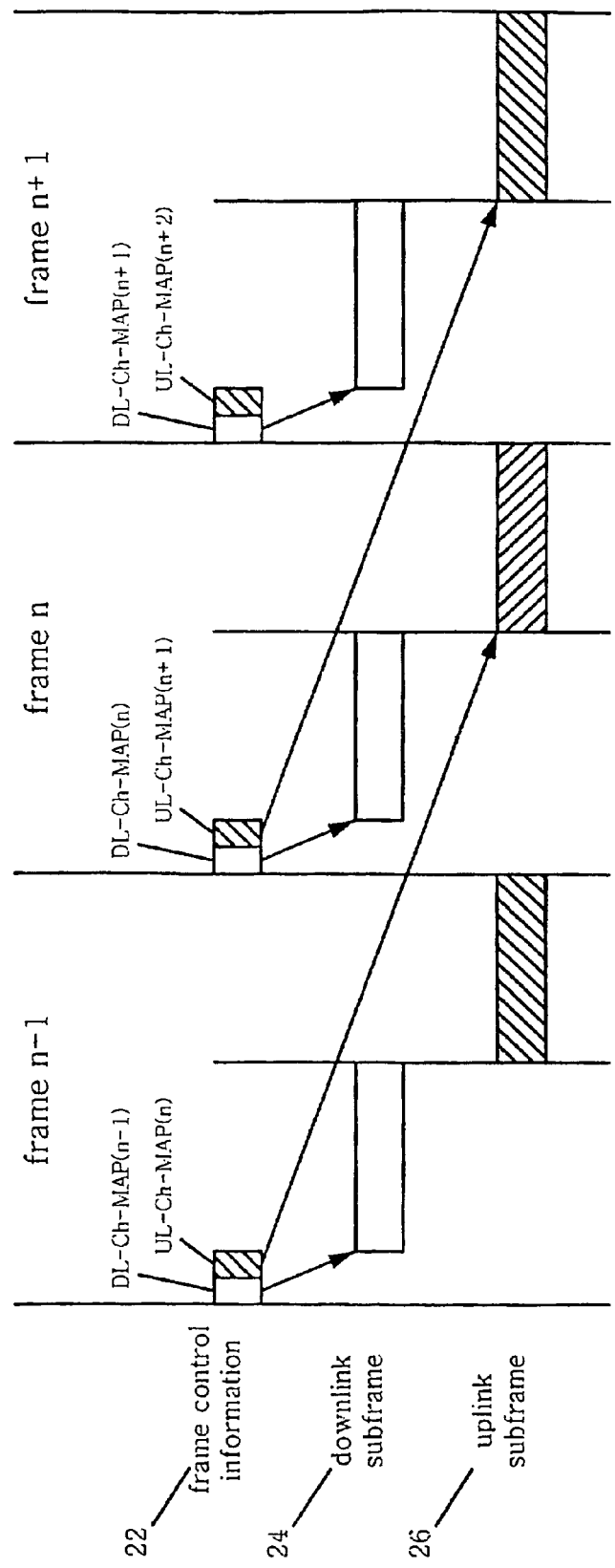
FIG. 3 is a diagram illustrating frame control information and a channel mapping method for TDD according to an embodiment of the present invention.
Figure 3B:
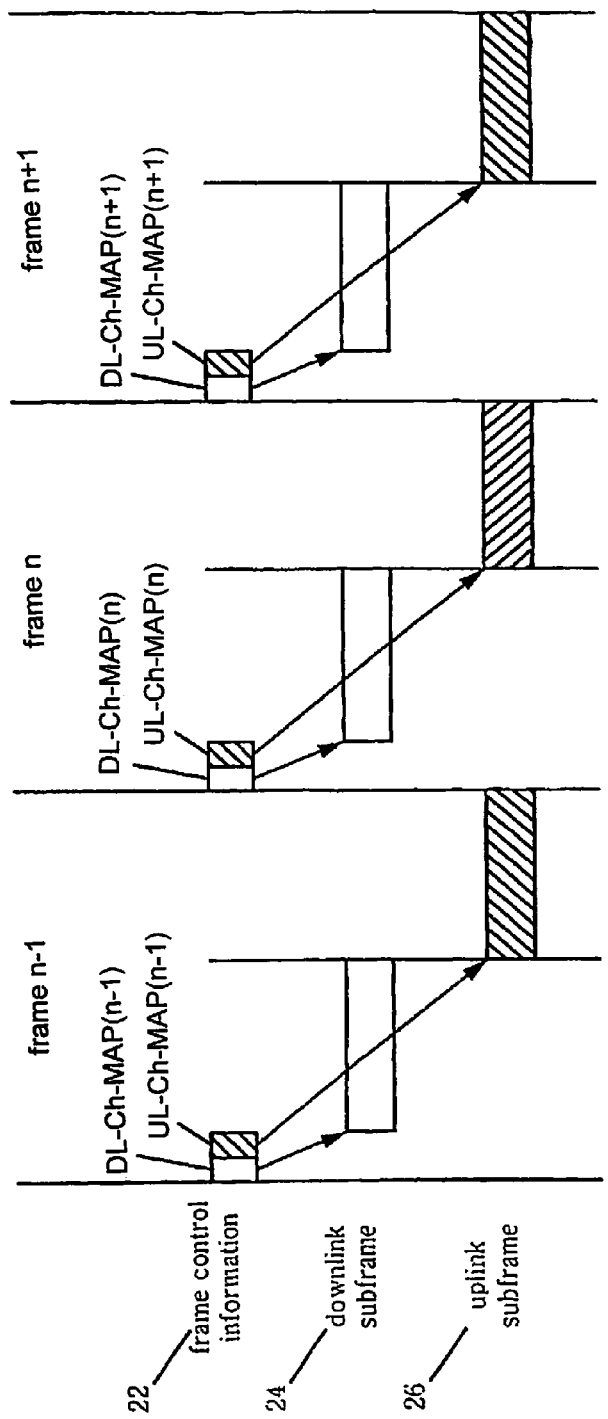

FIG. 3 is a diagram illustrating frame control information and a channel mapping method according to an embodiment of the present invention. Specifically, FIG. 3A is a diagram illustrating frame control information for a TDD mode and a channel mapping method according to a first embodiment of the present invention, and FIG. 3B is a diagram illustrating frame control information for the TDD mode and a channel mapping method according to a second embodiment of the present invention.

Referring to FIG. 3, frame control information 22 for a TDD mode is transmitted from a subscriber station 11 to a subscriber station over a forward control channel including mapping information of a downlink channel and an uplink channel. The downlink channel information, as shown in FIGS. 2A and 2B, reflects an assignment position of a downlink subframe 24 on a downlink channel. The uplink channel information reflects an assignment position of an uplink subframe 26 on an uplink channel.

Because it takes a certain time in defining assignment information of the uplink frame 26 on an uplink channel from a base station that starts transmitting the uplink information before transmitting the assignment information to the subscriber station, a system is needed in which a transmission time interval of a particular frame is longer than two times the maximum transmission delay of a signal transmitted from the base station to the subscriber station. In FIG. 3A, uplink channel information of a particular frame includes an assignment position of the same frame after a time period on an uplink channel.

Figure 4A:
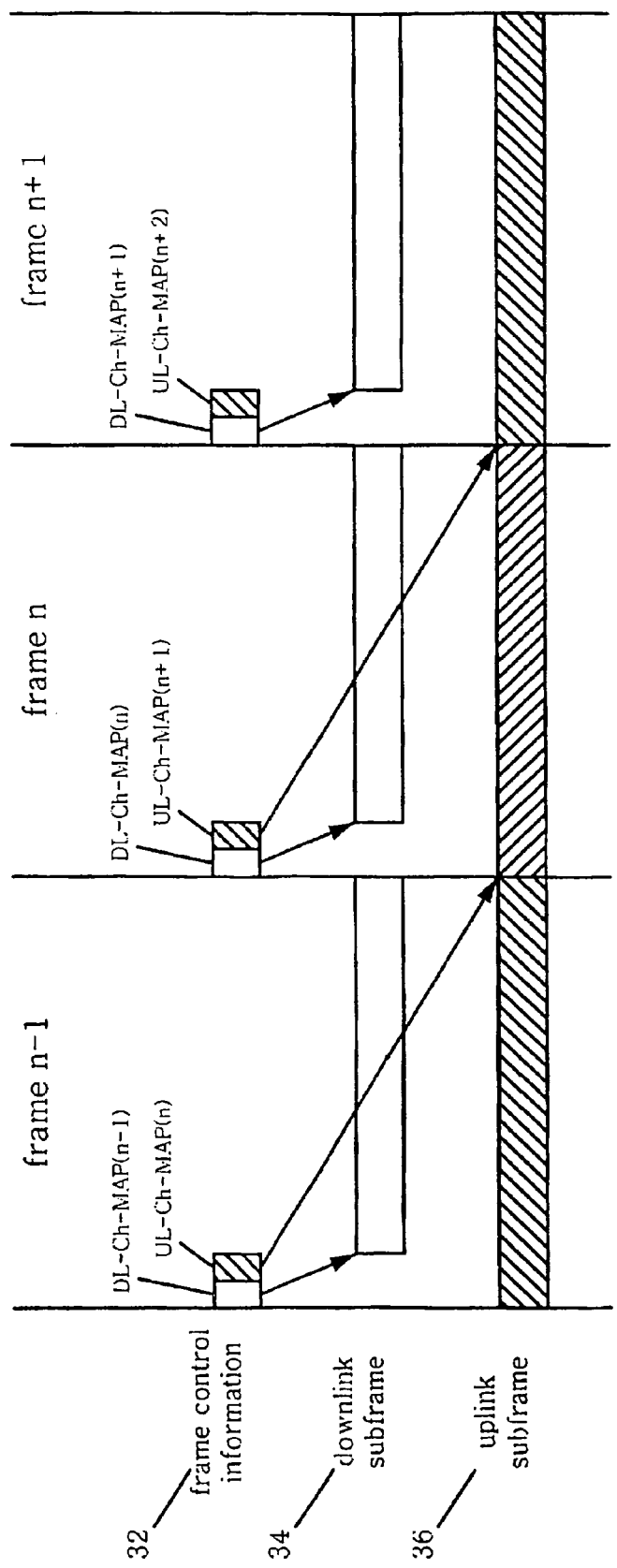
FIG. 4 is a diagram illustrating frame control information and a channel mapping method for FDD according to an embodiment of the present invention.
Figure 4B:
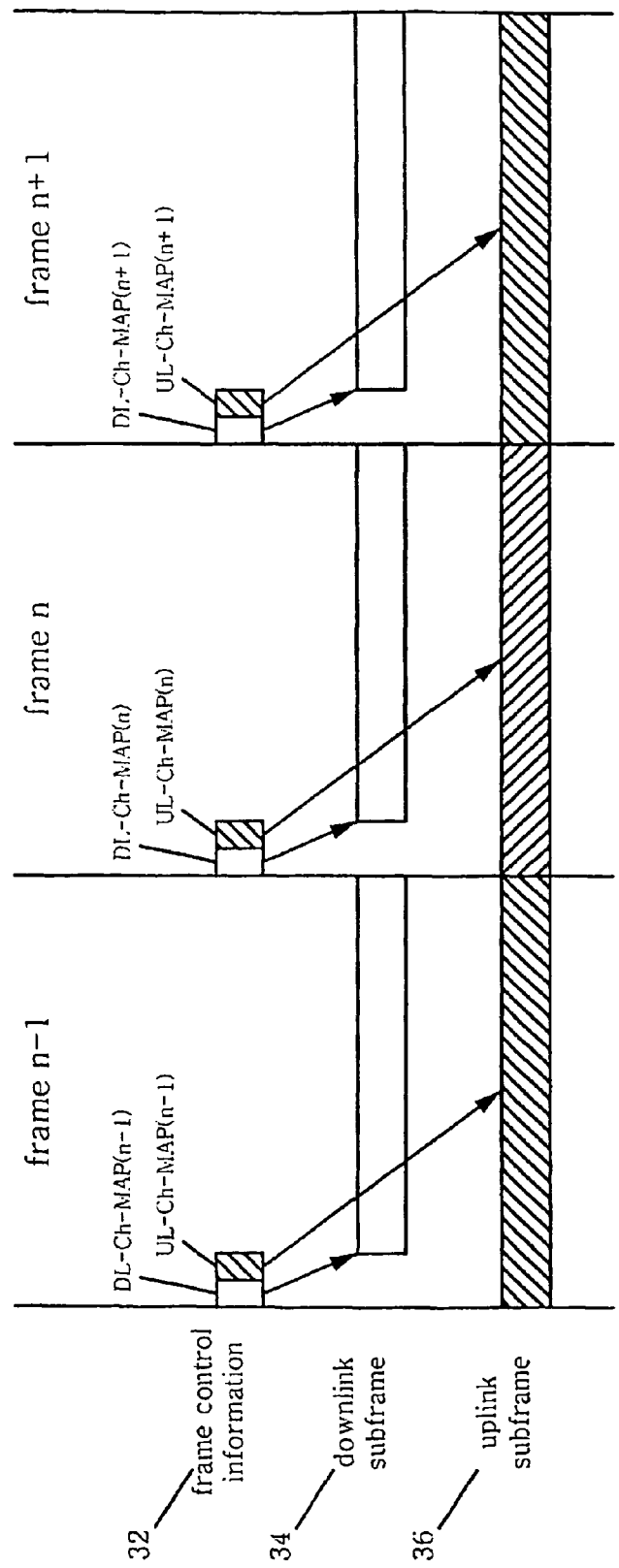

FIG. 4 is a diagram illustrating frame control information and a channel mapping method according to an embodiment of the present invention. Specifically, FIG. 4A is a diagram illustrating frame control information for an FDD mode and a channel mapping method according to a first embodiment of the present invention, and FIG. 4B is a diagram illustrating frame control information for the FDD mode and a channel mapping method according to a second embodiment of the present invention.

Referring to FIG. 4, the FDD mode described below has a similar operation to that of the TDD mode of FIG. 4. That is, frame control information 32 can be transmitted from a base station 11 to a subscriber station 12 over a forward control channel for the FDD mode. The frame control information 32 includes mapping information for a downlink channel and an uplink channel. Further, the downlink channel information reflects an assignment position of a downlink subframe 34 on a downlink channel, and the uplink channel information reflects an assignment position of an uplink subframe 36 on an uplink channel.

In FIG. 4A, particular uplink channel information includes an assignment position of the same frame after a time period on an uplink channel. In addition, a base station receiving uplink or downlink broadcasting help can transmit parameter information on at least one channel defined for an access request of a subscriber station.

Meanwhile, it is necessary to invent a system for notifying multiple backoff domain assignment on an access channel to a subscriber station having separation information of a common access channel as well as information on a multiple backoff domain corresponding to each access channel.

A process of assigning a multiple backoff domain on an access channel will be described below with reference to FIG. 5.

Figure 5A:
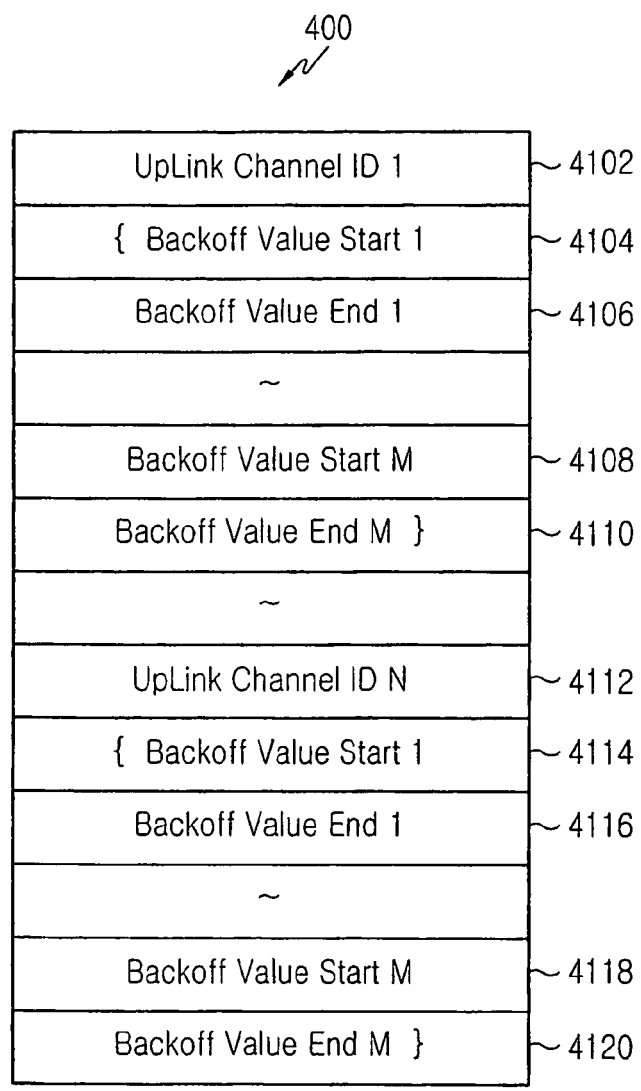
FIG. 5 is a diagram illustrating a multiple backoff domain individually corresponding to each access channel and two mapping formats of a multiple access channel according to an embodiment of the present invention.
Figure 5B:
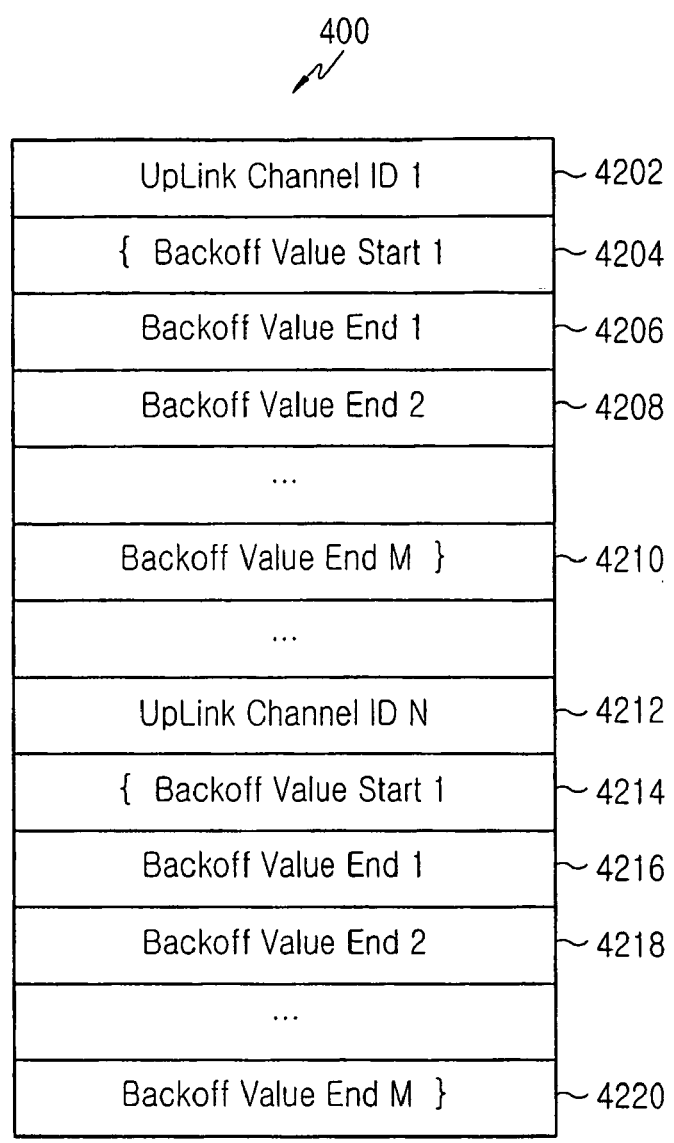

FIG. 5 is a diagram illustrating a multiple backoff domain individually corresponding to each access channel and two mapping formats of a multiple access channel according to an embodiment of the present invention. Specifically, FIG. 5A is a diagram illustrating an example of a mapping format of an uplink access channel for providing a multiple backoff domain, and FIG. 5B is a diagram illustrating another example of a mapping format of an uplink access channel for providing a multiple backoff domain.

As illustrated in FIG. 5, an uplink reverse access channel (UL-RACH-MAP) 400 represents other combined downlink broadcasting information or a parameter corresponding to an access channel on an uplink channel. A format of the uplink reverse access channel 400 represents positions of M backoff domains and N uplink access channels corresponding to each uplink access channel.

Referring to FIG. 5A, a parameter corresponding to each uplink access channel includes at least one uplink channel ID and backoff start values and backoff end values of M backoff domains. A parameter corresponding to an uplink (reverse) access channel having an ID#1 includes not only an uplink channel ID#1 4102, but also parameters defining M backoff domains.

The parameters of the M backoff domains are as follows.

That is, the parameters include parameters defining a first backoff domain, such as a backoff end value #1 4106 and a backoff start value #1 4104 of the first backoff domain, among values for an $M^{th}$ backoff domain, such as a sequential backoff start value #M 4108 and a backoff end value #M 4110 of the $M^{th}$ backoff domain.

The format of the uplink reverse access channel 400 also needs to represent assignment positions of parameters for other (N−1) uplink channels. An assignment format of parameters for each access channel is similar to that of an access channel having the ID#1. For example, an assignment format for N access channels includes different parameter fields 4114 to 4120 of M backoff domains, and an $N^{th}$ access channel's ID (uplink channel D#N) 4112.

A brief description will now be made of the handover ranging start value and the handover ranging end value.

That is, the handover ranging start value and the handover ranging end value include HO_ranging_start representing a start point of backoff using initial ranging, i.e., representing an initial backoff window size for initial ranging performed on a subscriber station during a handover processing time, and HO_ranging_end representing a final backoff window size for initial ranging performed on the subscriber station during the handover processing time. The highest order bits of the HO_ranging_start should not be used, and their value is set to '0'. Also, the highest order bits of the HO_ranging_end should not be used, and their value is also set to '0'. The backoff value represents a kind of a waiting time value for which subscriber stations should wait when they fail to request ranging. At this moment, the base station transmits to the subscriber station the backoff value which is time information for which the subscriber station should wait for the next ranging when it fails to perform ranging.

Next, referring to FIG. 5B, parameters corresponding to each uplink channel include not only at least one uplink channel ID but also a backoff start value #1 of a first backoff domain and a backoff end value of every back-off domain corresponding to each uplink access channel ID.

Parameters corresponding to the uplink (reverse) access channel having an ID#1 include not only parameters defining M backoff domains but also an uplink channel ID#1 4202.

The parameters of the M backoff domains are as follows.

The M backoff domains include parameters that define a first backoff domain having a backoff end value #1 4206 and a backoff start value #1 4204 of an individual first backoff domain.

A start value of a second backoff domain can be obtained from an end value #1 of a backoff domain for the first backoff domain. Accordingly, end values of respective backoff domains need declaration from a backoff end value #2 4208 to a backoff end value #M 4210.

Meanwhile, in a format of the uplink reverse access channel 400, an assignment format for parameters of other (N−1) access channels is similar to that of parameters for an access channel having an ID#1. For example, N access channels have an uplink channel ID#N of an $N^{th}$ access channel, and include parameter fields 4214 to 4220 for M backoff domains.

A description will now be made of a backoff algorithm for multilevel access services.

The multilevel backoff algorithm is used for providing multilevel access services on a common access channel, and the multilevel backoff algorithm includes a backoff algorithm on the ALOHA technology. That is, the multilevel backoff algorithm selects a backoff value on a domain selected by including the backoff algorithm of the ALOHA technology and selects a backoff domain according to an access type. An exponential backoff algorithm is popularly used in the ALOHA technology. Such an algorithm is used in, for example, IEEE 802.16a.

The multilevel backoff algorithm will be described with reference to a 2-level backoff domain.

A subscriber station 12 acquires information on a reverse access channel related to assignment information of a 2-level backoff domain on an access channel corresponding to assignment information of the 2-level backoff domain by detection in a forward common control channel. Such a 2-level backoff domain is defined as $[0,\beta]$ and $[\beta+1,\gamma]$ of M having two values of two backoff domains corresponding to a particular access channel, in the format of the uplink reverse access channel 400. Both of the $\gamma$ ($\gamma>\beta$) and the $\beta$ have a positive integer value. Such an access channel provides two types of access services including a common access service and a fast access service. Such two types of access services are provided by two selected domains $[0,2^\beta]$ and $[2^\beta+1,2^\gamma]$ that use a binary exponential backoff algorithm. For example, when a subscriber station needs a common access service, a backoff domain time is randomly selected from the second backoff domain $[2^\beta+1,2^\gamma]$. In addition, when the subscriber station needs a fast access service, a backoff time is randomly selected from the first backoff domain $[0,2^\beta]$.

Values of the $\gamma$ and the $\beta$ are selectively determined according to the number of subscriber stations and service execution. That is, the selection of $\gamma$ and $\beta$ should satisfy execution requests related to a fast access service, such as a collision rate between access requests and a parameter of an allowable access time. In addition, the selection of $\gamma$ and $\beta$ should consider a collision rate between fast access requests and common access requests and parameters for an allowable access time of the common access service. Commonly, it is guaranteed that the fast access service has a shorter access service time than the common access service.

Meanwhile, the multilevel backoff algorithm proposed in the present invention can be easily extended even when the M is larger than 2. That is, compared with a general exponential backoff algorithm, the multilevel backoff algorithm is advantageous in that it is easy to separate different types of access services and easy to relieve collision of access requests between a 2-level access service provided on a common access channel by separation of a backoff domain and other types of access services. Furthermore, compared with a method for providing a common access channel for another type of an access request, the multilevel backoff algorithm can save network resource and bandwidth. The multilevel backoff algorithm can be easily developed in IEEE 802.16e in order to satisfy requests that provide a fast access for hard handover using a common access channel.

A description will now be made of a method for defining a network access request for handover on a common access channel and providing a multilevel access service.

A subscriber station can obtain access information corresponding to each access channel by detecting other uplink broadcasting information and an uplink channel. In using common access channel for accessing a communication system and receiving a service, the subscriber station can initialize an access request to a selected base station on a common access channel. During a period for which a multilevel access service is provided on the common access channel, a communication system needs to cooperate with the subscriber station. Accordingly, the communication system can effectively provide a service corresponding to a request of the subscriber station and define an access request of the subscriber station.

A method for providing a multilevel access service on a common access channel will now be described together with an example of IEEE 802.16e.

The multilevel service includes processing a common access request initial value and handover. When the common access request initial value is considered, an access request for handover can be obtained by simplifying a network entering service.

In the method for providing a multilevel access service on a common access channel, a subscriber station first performs an operation of detecting an uplink broadcasting message.

That is, in order to provide a multilevel access service on a common access channel, a base station broadcasts, periodically or on an on-demand basis, channel assignment information of cells, including mapping information of a multiple backoff domain on an uplink reverse access channel corresponding to the request of a subscriber station and assignment information of an uplink channel. After completing synchronization with the base station on a downlink, the subscriber station acquires parameter information of an access channel by detecting other downlink broadcasting information or an uplink channel.

Next, the subscriber station performs transmission request initialization.

That is, the subscriber station can initialize an access request of a base station selected on a selected uplink access channel. In order to provide handover on a common access channel, compatibility with IEEE 802.16a, and a different type of an access service including an access initial value, the subscriber station adopts the above-stated multilevel backoff algorithm, and determines and calculates a backoff time of a selected backoff domain. Such a method is used for providing a service having at least two levels and easily relieving collision between types of different access requests.

For handover of a subscriber station on the common access channel, an access request message is required. For a system used in defining such an access request message, an IEEE 802.16a access request message such as RNG-REQ can be continuously used as an original access initial value of the subscriber station in order to provide another access service for another type of an access request, together with an example of an IEEE 802.16e specification. The access request message for handover can be an access request message using previously assigned pseudo-random code information, adding a field for defining a handover request on an initial RNG-REQ access request message, or having a handover request ID.

The type of the access request message will be described herein below.

The access request message includes an access request message type of a MAC layer. That is, an access request message for handover is an access request message including a field for defining a handover request, or can add a field for defining a handover request on an initial access request message RNG_REQ. For an OFDM operation mode or a single carrier on IEEE 802.16e, an access request for handover can use a previously assigned access request message. A format of the previously assigned access request message for handover will be described below with reference to FIG. 6.

Figure 6:
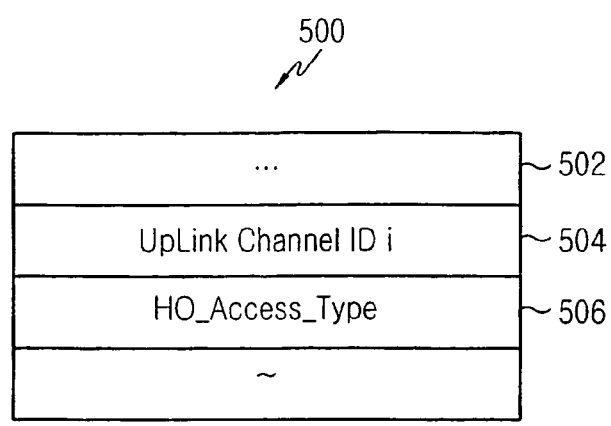
FIG. 6 is a diagram illustrating a format of an access request message used for handover according to an embodiment of the present invention.

FIG. 6 is a diagram illustrating a format of an access request message used for handover according to an embodiment of the present invention.

Referring to FIG. 6, a format of an access request message (REN-REQ-HO) 500 previously assigned for handover is illustrated. The previously assigned access request message includes a handover access request type ID 504 and a used uplink access channel ID 502. The access request message for handover can be implemented by adding the handover request type ID 504 to an initial RNG-REQ access request message.

A pseudo-random code-based access request process for handover will be described below.

In a common access channel, a subscriber station can initialize a network access request message for handover by a pseudo-random code. The initialization process will be described below.

First, the pseudo-random code is generated.

Such a pseudo-random code is defined as one of three types of pseudo-random codes previously used by a request of a subscriber station in an OFDM scheme defined in IEEE 802.16a, and the three types include a network service for initial ranging, periodic ranging, and an individual bandwidth.

The three types of pseudo-random codes are generated from a generator polynomial of Equation (1), and have a long pseudo-random code type output value.

$$1+X^1+X^4+X^7+X^{15} \qquad (1)$$

A pseudo-random code used in the three types, i.e., initial ranging, periodic ranging and bandwidth request ranging, has an output value of a long pseudo-noise code, but a clock generated at each pseudo-random code has a different value. In case of default, a size of each pseudo-random code is 106 bits.

In order to simplify a network entering procedure requested by a system managing hard handover, an IEEE 802.16e OFDMA scheme uses a system defining a network access request for hard handover. For such a system, an access request message for hard handover defined by a pseudo-random code can be used. In addition, for compatibility with IEEE 802.16a and convenient system design, an H pseudo-random code is required by an access request for handover.

Although generation of the H pseudo-random code has a result value of a long pseudo-random code, selection of a clock can have a different result value from the three types of pseudo-random codes.

A method for generating H pseudo-random codes requested by an access request for handover will now be described below.

An output value of a long pseudo-noise code occurring at an output of the generator polynomial of Equation (1), i.e., first N codes, are used for initial ranging, and $0^{th}$ to $(106*N-1)^{th}$ clocks are selected.

Next, M codes are used for periodic ranging, and $(106*N)^{th}$ to $(106*(N+M)-1)^{th}$ clocks are selected.

Next, L codes are used for bandwidth request ranging, and $(106*(N+M))^{th}$ to $(106*(N+M+L)-1)^{th}$ clocks are selected.

Finally, H codes are used for an access request for hard handover, and $(106*(N+M+L)^{th}$ to $(106*(N+M+L+H)-1)^{th}$ clocks are selected.

The first N codes can be used for an access request for hard handover, the M codes can be used for initial ranging, the L codes can be used for periodic ranging, and the H codes can be used for bandwidth request ranging. In addition, each of the above codes can be arranged in several types.

A process of assigning the pseudo-random codes will be described herein below.

In order to make a system for defining an access request for hard handover, the H pseudo-random codes generated by a system can be generally assigned to each cell. Such a method for generating the H pseudo-random codes is equal to the method described above. When a particular subscriber station performs hard handover, pseudo-noise codes assigned by a base station newly selected for a fast access service are randomly used in each cell. Such an assignment method is simple in structure, and mutual messages exchanged between the subscriber station and the system are small in number, but its characteristic is poor in terms of mobility. Thus, this method is not suitable for irregularly distributed subscriber stations.

A system according to another embodiment of the present invention can dynamically assign H pseudo-random codes of cells at a request of the cells. Each cell sends, periodically or on an on-demand basis, identifiers or different signs on a forward common access channel. By detection on a common access channel, a subscriber station can acquire information on pseudo-noise codes assigned to a cell in a position of a newly selected base station. In this manner, it can be applied even to an environment where distribution of subscriber stations suffers irregular change. For example, a system can assign more pseudo-random codes to the cells having excessive handover traffic. Disadvantageously, however, the system must transmit assignment information of the pseudo-random codes periodically or on an on-demand basis.

A description will now be made of a MAC layer response message for an access request.

After correctly receiving an access request from a subscriber station, a base station assigns a unique connection identifier (CID) for the access request from the subscriber station. The base station handles the access request from the subscriber station by a handshake method. After receiving an RNG-REQ-HO or RNG-REQ access request message from the subscriber station, the base station checks a system capable of providing a service for initializing an access request by a subscriber station. When the system check is completed, the base station transmits an RNG-RSP access request response message to the subscriber station. Accordingly, the subscriber station includes information on the unique connection identifier CID set up for the access request.

A description will now be made of a method for providing a multilevel access service in a common access channel according to an embodiment of the present invention.

In IEEE 802.16e, when handover occurs, a subscriber station can initialize an access request of a newly selected base station. For compatibility with IEEE 802.16a, an access procedure of the subscriber station can maintain an IEEE 802.16a network entering procedure. An IEEE 802.16e network entering procedure, compared with the IEEE 802.16a network entering procedure, is advantageous in that a network entering procedure of a subscriber station for hard handover can be simply performed with several processes of exchanging information such as time and service capacity of the system.

The access procedure of a subscriber station for handover will be described herein below.

In the access procedure of a subscriber station for handover, the subscriber station first performs synchronization with the base station through detecting and tracing in a forward channel. Thereafter, the subscriber station acquires forward and reverse channel assignment information. In this case, the subscriber station operates in cooperation with a base station newly selected to perform access processing. Such an access procedure includes performing partial authentication and registration step of the subscriber station, and reestablishing session connection.

A ranging procedure including the occurrence of handover will now be described with reference to FIG. 7.

Figure 7A:
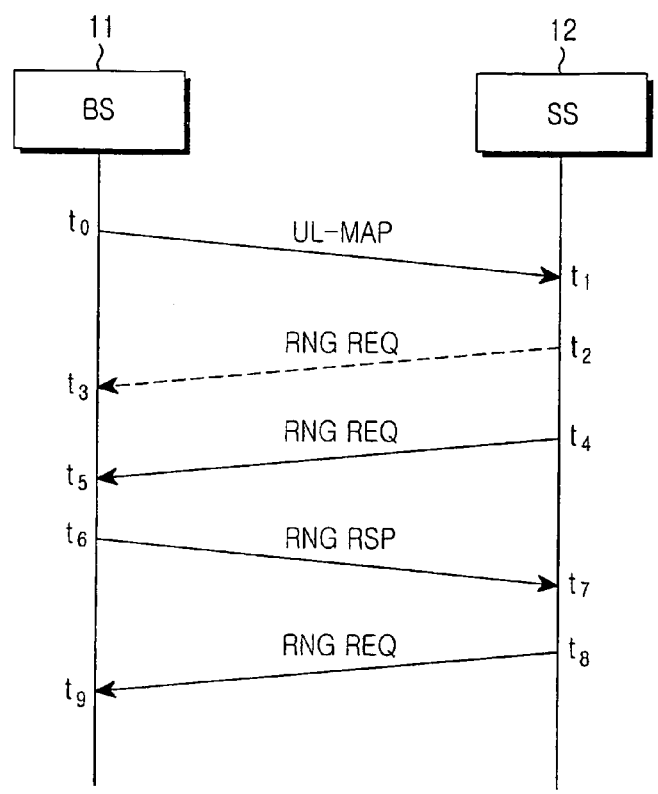
FIG. 7 is a diagram illustrating a procedure for processing ranging when hard handover occurs according to an embodiment of the present invention.
Figure 7B:
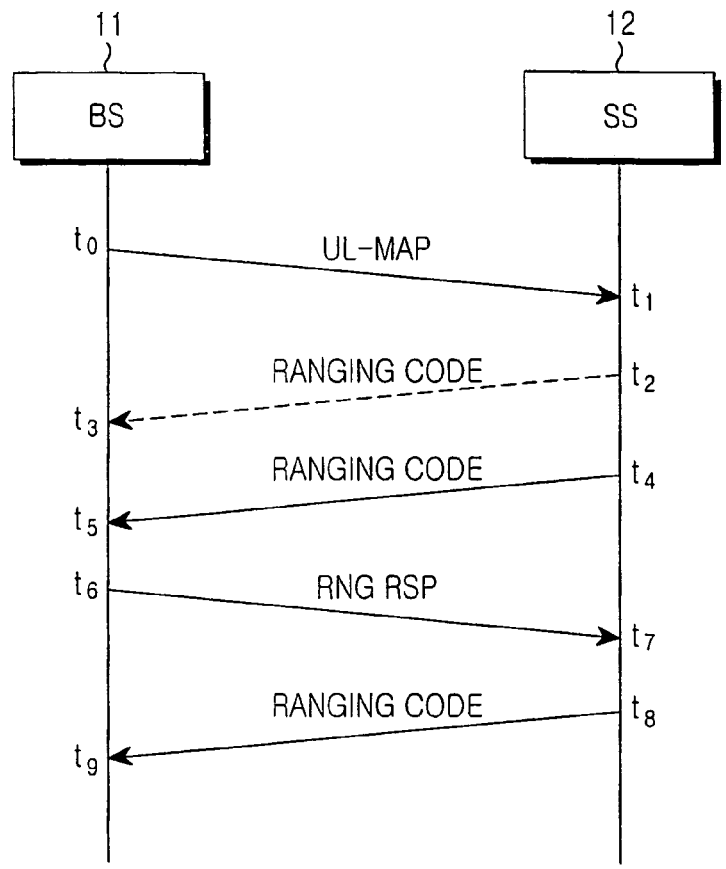

FIG. 7 is a diagram illustrating a procedure for processing ranging when hard handover occurs according to an embodiment of the present invention. Specifically, FIG. 7A is a diagram illustrating a ranging procedure when IEEE 802.16e hard handover occurs, and FIG. 7B is a diagram illustrating a ranging procedure when OFDMA hard handover occurs. It can be understood herein that when hard handover occurs, the ranging procedure is easily compatible with an IEEE 802.16a initial ranging procedure.

Referring to FIG. 7A, at a time t0, a base station 11 broadcasts an uplink channel message of a cell on a common access request channel periodically or on ail on-demand basis.

At a time t1, a particular subscriber station on the cell receives the uplink channel message. The uplink channel message includes related parameters representing an uplink reverse access channel as an access channel for M=2 shown in FIG. 4. In this way, the particular subscriber station selects an access channel.

At a time t2, the particular subscriber station initializes an RNG_REQ or RNG-REQ-HO access request to the base station on the selected access channel.

At a time t3, it is assumed that the base station receives an access request message. However, collisions occurring due to access request messages from other subscriber stations during the time t3 may cause a loss of the access request messages. If the subscriber station fails to correctly receive an access request response message corresponding to the access request of the particular subscriber station from the base station after waiting for several time periods, it is determined that the access request fails. Then the subscriber station selects a corresponding backoff domain according to an access service type. For example, this selects a first backoff domain for handover and selects a second backoff domain for a common access request, and each subscriber station can calculate a backoff time with a multilevel backoff algorithm for a time t2 at a time t4.

At the time t4, it is assumed that the subscriber station initializes an RNG-REQ or RNG-REQ-HO access request message.

At a time t5, the base station correctly receives the RNG-REQ or RNG-REQ-HO access request message form the subscriber station. The base station assigns an identifier for the access request and sends an access response message.

At a time t6, the response message includes ED information for the subscriber station, including several signs for response.

At a time t7, if the subscriber station has correctly received the RNG-RSP response message from the base station, the subscriber station initializes the RNG-REQ or RNG-REQ-HO access request message.

At a time t8, the base station should be informed that the subscriber station has correctly received transmission-related information from the base station. Accordingly, the subscriber station complies with a subscriber's request and transmits an identifier assigned by the base station.

At a time t9, while the base station receives the RNG-REQ or RNG-REQ-HO access request message from the subscriber station, it is determined whether the subscriber station has correctly received the response and the system continuously performs the next step.

Referring to FIG. 7B, a ranging procedure supporting occurrence of hard handover for an OFDMA mode in IEEE 802.16, proposed by the present invention, is illustrated. FIG. 8B is different from FIG. 7A in that an access request is completed by pseudo-random codes for ranging. In order to use a system for defining an access request for hard handover on a common access channel and simplify a network entering procedure at occurrence of hard handover, a subscriber station selects a previously assigned pseudo-random code to complete an access request on the common access channel. A cell assignment method and a pseudo-random code generation method are equal to the methods described above.

A procedure for implementing the ranging process by the subscriber station will be described herein below.

Figure 8:
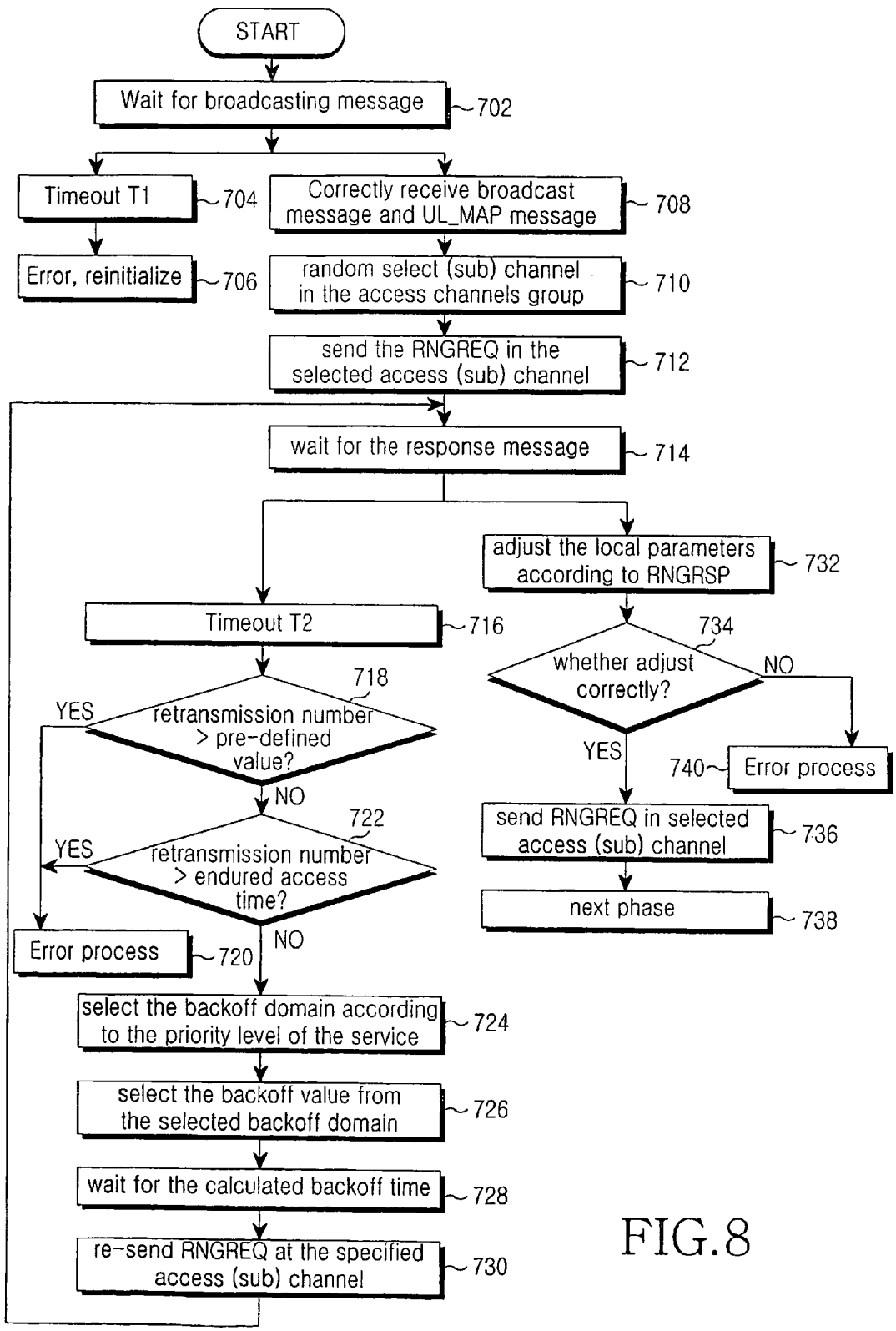
FIG. 8 is a diagram illustrating an access request procedure by a subscriber station according to an embodiment of the present invention.

FIG. 8 is a diagram illustrating an access request procedure by a subscriber station according to an embodiment of the present invention.

Referring to FIG. 8, a subscriber station periodically receives a broadcasting message from a base station on a common control channel by detection (702). If reception of the broadcasting message is not achieved for a time t1 (704), the subscriber station detects an error and performs re-initialization (706). The t1 means a maximum time required for receiving the broadcasting message.

Meanwhile, if the subscriber station normally receives a broadcasting message from the base station and receives uplink channel information UL-MAP within the time t1 (708), the subscriber station acquires assignment information of an access channel group from the received uplink channel information. The subscriber station randomly selects an access channel from the access channel group and transmits an access request message RNG-REQ-HO or RNG-REQ in the selected access channel (712). A format of the RNG-REQ-HO has been described with reference to FIG. 5. After transmitting the access request message, the subscriber station waits for a response message RNG-RSP from the base station (714).

If a time for which the subscriber station waits a response message RNG-RSP from the base station exceeds t2 (716), the subscriber station compares the number of retransmissions with a predefined value (718). The t2 represents a maximum time for which the subscriber station waits a response.

If the number of retransmissions is larger than the predefined value as a result of the comparison between the time for which the subscriber station waits a response message from the base station and the time t2, the subscriber station performs error indication and error processing (720). If the number of retransmissions is smaller than the predefined value as a result of the comparison, the subscriber station compares the number of retransmissions with an allowable access processing time (722). If the number of retransmissions exceeds the allowable access processing time, the subscriber station proceeds to step 720 and performs error processing (720). If the number of retransmissions does not exceed the allowable access processing time, the subscriber station selects a backoff domain according to a priority level of the service (724).

The priority level is selected at a start point and an end point of the backoff. For example, when hard handover occurs, the subscriber station selects a backoff domain according to a priority level of the hard handover.

After step 724, the subscriber station selects a backoff value from a backoff domain selected by a multilevel backoff algorithm (726). When the selection of a backoff value is completed, the subscriber station waits for a calculated backoff time (728). When the backoff time expires, the subscriber station retransmits an RNG-REQ-HO or RNG-REQ message at the access channel described above (730), and then proceeds to step 714 where it waits for a next response message RNG-RSP.

However, if the subscriber station receives a response message RNG-RSP from the base station for the response message reception waiting time t2 in step 714, the subscriber station adjusts local parameters according to the response message RNG-RSP (732). Subsequently, the subscriber station determines whether the local parameters were correctly adjusted (734). When the adjusted parameters are not normal, the subscriber station performs error processing (740). However, when the adjusted parameters are normal, the subscriber station retransmits an access request message RNG-REQ-HO or RNG-REQ on the selected access channel (736). Thereafter, the subscriber station proceeds to a next step and performs a next process (738).

The RNG-REQ or RNG-REQ-HO message includes an identifier of a base station, assigned for the access request, and the access request means a base station where the subscriber station successfully receives related information transmitted by the base station.

While the invention has been shown and described with reference to a certain preferred embodiment thereof, it will be understood by those skilled in the art that various changes in form and details may be made therein without departing from the spirit and scope of the invention as defined by the appended claims.

EFFECTS OF THE INVENTION

According to the new method for providing multilevel access services in a common access channel, when subscriber stations fail ranging request, a backoff value representing a waiting time until a next re-request can be adjusted. That is, when ranging request fails during handover, a preceding backoff time having a high priority level is selected thereby enabling fast handover.

In addition, the present invention proposes a structure for defining a network access request for handover by using a common access channel to perform a multiple access request service, thereby reducing collisions occurring in a wireless communication system and saving network resource such as a bandwidth.

Further, the present invention can provide a fast access service for a subscriber station, being capable of contradicting a request for the fast access service by hard handover and simplifying a network entering procedure requested by a handover process.

Moreover, a system compatible with IEEE 802.16a technology is simply designed through a method for generating pseudo-random codes using the same polynomial generator, and a method for assigning binary pseudo-random codes is easy to design a system for defining an access request for hard handover.

What is claimed is:

1. A method for performing handover by a subscriber station in a mobile communication system, the method comprising the steps of:
   receiving, from a base station, a plurality of backoff domains including backoff start information and backoff end information for each of rangings;
   transmitting a ranging request message to the base station;
   selecting one of the plurality of backoff domains according to whether a ranging response message is received from the base station in a predetermined time; and
   determining a backoff value for handover based on the backoff start information and the backoff end information including the selected backoff domain,
   wherein the selected backoff domain is selected based on a ranging priority level that is determined according to a service quality level of data provided to the subscriber station and whether handover of the subscriber station is performed.

2. The method of claim 1, further comprising the step of re-requesting ranging after waiting for the determined backoff value.

3. A subscriber station for performing handover in a mobile communication system, the subscriber station comprising:
   a receiver for receiving, from a base station, a plurality of backoff domains including backoff start information and backoff end information for each of rangings;
   a transmitter for transmitting a ranging request message to the base station; and
   a controller for selecting one of the plurality of backoff domains according to whether a ranging response message is received from the base station in a predetermined time, and determining a backoff value for handover according to the backoff start information and the backoff end information including the selected backoff domain,
   wherein the selected backoff domain is selected based on a ranging priority level that is determined according to a service quality level of data provided to the subscriber station and whether handover of the subscriber station is performed.

4. The subscriber station of claim 3, wherein the controller re-requests ranging to the base station after waiting for the determined backoff value.

5. The subscriber station of claim 3, wherein the backoff start information is formed with an initial backoff window size for performing initial ranging of the subscriber station for a handover processing time.

6. The subscriber station of claim 3, wherein the backoff end information is formed with a final backoff window size for performing initial ranging of the subscriber station.

7. The method of claim 1, wherein the backoff start information is formed with an initial backoff window size for performing initial ranging of the subscriber station for a handover processing time.

8. The method of claim 1, wherein the backoff end information is formed with a final backoff window size for performing initial ranging of the subscriber station.

9. A base station for performing handover in a mobile communication system, the base station comprising:
- a transmitter for transmitting, to a subscriber station, a plurality of backoff domains including backoff start information and backoff end information for each of rangings, and a ranging response message according to a reception of a ranging request message; and
- a receiver for receiving the ranging request message from the subscriber station,
- wherein one of the plurality of backoff domains is selected by the subscriber station according to whether the ranging response message is received from the base station in a predetermined time, and
- wherein the selected backoff domain is selected based on a ranging priority level that is determined according to a service quality level of data provided to the subscriber station and whether handover of the subscriber station is performed.

10. The base station of claim 9, wherein the transmitter transmits an access request response message including a connection identifier (CID) to one of the subscriber stations, if the access request message is received from the subscriber station.

11. The base station of claim 10, wherein the access request message includes one of an initialized access request message requested by the subscriber station to the base station for a handover processing time and a network access request message including a field indicating a handover request type.

12. The base station of claim 11, wherein the network access request message is determined by adding the field defining the handover request type to the initial access request message.

13. The base station of claim 11, wherein the network access request message is determined by using information on previously assigned pseudo-random codes.

14. The method of claim 1, the plurality of backoff domains are determined so that a time period occupied by a backoff domain having a highest priority level includes a shortest time period.

15. A method for performing handover by a base station in a mobile communication system, the method comprising the steps of:
- transmitting, to a subscriber station, a plurality of backoff domains including backoff start information and backoff end information for each of rangings; and
- transmitting a ranging response message to the subscriber station, if a ranging request message is received from the subscriber station,
- wherein one of the plurality of backoff domains is selected by the subscriber station according to whether the ranging response message is received from the base station in a predetermined time, and
- wherein the selected backoff domain is selected based on a ranging priority level that is determined according to a service quality level of data provided to the subscriber station and whether handover of the subscriber station is performed.

16. The method of claim 15, wherein further comprises the steps of:
- if an access request message is received from the subscriber station, transmitting an access request response message including a connection identifier (CID) to the subscriber station.

17. The method of claim 16, wherein the access request message includes one of an initialized access request message requested to the base station by the subscriber station for a handover processing time and a network access request message including a field indicating a handover request type.

18. The method of claim 17, wherein the network access request message is determined by adding the field defining the handover request type to the initial access request message.

19. The method of claim 17, wherein the network access request message is determined by using information on previously assigned pseudo-random codes.

20. The method of claim 15, the plurality of backoff domains are determined so that a time period occupied by a backoff domain having a highest priority level includes a shortest time period.

21. The subscriber station of claim 3, the plurality of backoff domains are determined so that a time period occupied by a backoff domain having a highest priority level includes a shortest time period.

22. The base station of claim 9, the plurality of backoff domains are determined so that a time period occupied by a backoff domain having a highest priority level includes a shortest time period.

* * * * *